United States Patent
Ulfig

(10) Patent No.: US 8,733,835 B2
(45) Date of Patent: May 27, 2014

(54) VEHICLE SEAT COVER AND VEHICLE SEAT WITH SUCH A COVER

(75) Inventor: Emanuel Ulfig, Aachen (DE)

(73) Assignee: Johnson Controls Technology Company, Holland, MI (US)

(*) Notice: Subject to any disclaimer, the term of this patent is extended or adjusted under 35 U.S.C. 154(b) by 231 days.

(21) Appl. No.: 12/988,427

(22) PCT Filed: Apr. 17, 2009

(86) PCT No.: PCT/EP2009/002819
§ 371 (c)(1),
(2), (4) Date: Apr. 5, 2011

(87) PCT Pub. No.: WO2009/127421
PCT Pub. Date: Oct. 22, 2009

(65) Prior Publication Data
US 2011/0181083 A1    Jul. 28, 2011

(30) Foreign Application Priority Data

Apr. 18, 2008 (DE) .......... 10 2008 019 775
Nov. 19, 2008 (DE) .......... 10 2008 058 219

(51) Int. Cl.
*A47C 31/00* (2006.01)

(52) U.S. Cl.
USPC ...................... 297/224; 297/219.1

(58) Field of Classification Search
USPC ......... 297/219.1, 228.1–228.11, 229, 452.63, 297/452.64, 224, 219, 218.1–218.5, 225; 442/327
See application file for complete search history.

(56) References Cited

U.S. PATENT DOCUMENTS

| | | | |
|---|---|---|---|
| 1,820,104 A | 8/1931 | Whaley | |
| 1,857,418 A | 5/1932 | Wedler | |
| 1,942,111 A | 1/1934 | Levi | |
| 1,970,820 A * | 8/1934 | Scheellkopf | 297/224 |
| 2,227,180 A * | 12/1940 | Falk | 297/223 |
| 2,793,683 A * | 5/1957 | Trubitt | 297/224 |
| 2,848,039 A | 8/1958 | Lenz | |
| 3,063,271 A | 11/1962 | Faust et al. | |
| 3,088,773 A * | 5/1963 | Horrocks et al. | 297/452.1 |
| 1,153,209 A | 5/1969 | Shilco | |
| 4,232,898 A * | 11/1980 | Bodrero | 297/228.1 |
| 4,478,453 A * | 10/1984 | Schutz | 297/219.12 |
| 4,545,614 A * | 10/1985 | Abu-Isa et al. | 297/284.2 |

(Continued)

FOREIGN PATENT DOCUMENTS

| | | |
|---|---|---|
| DE | 19636208 A1 | 3/1998 |
| DE | 29821823 U1 | 5/1999 |

(Continued)

OTHER PUBLICATIONS

International Search Report for application No. PCT/EP2009/002819 mailed Apr. 17, 2009.

(Continued)

*Primary Examiner* — David R Dunn
*Assistant Examiner* — Richard Lowry
(74) *Attorney, Agent, or Firm* — Fletcher Yoder P.C.

(57) ABSTRACT

A vehicle seat has a cover that comprises, in sections, a first layer and a second layer, wherein the first and second layers have different elasticities. The layers may be connected, such as by sewing. The layers may have strips arranged transversely to an expansion direction.

6 Claims, 2 Drawing Sheets

(56) References Cited

U.S. PATENT DOCUMENTS

| | | | | |
|---|---|---|---|---|
| 4,630,863 | A | * | 12/1986 | Roberts ............... 297/219.1 |
| 5,354,119 | A | * | 10/1994 | Nicholas ............ 297/188.07 |
| 5,388,293 | A | * | 2/1995 | Kistner ..................... 5/738 |
| D369,498 | S | * | 5/1996 | Newcomb ............... D6/513 |
| 5,549,355 | A | * | 8/1996 | Illulian .................. 297/224 |
| 5,655,813 | A | * | 8/1997 | Kirkpatrick ........... 297/220 |
| 5,785,381 | A | * | 7/1998 | Carter ................. 297/219.1 |
| 5,816,654 | A | * | 10/1998 | Ellis .................... 297/284.5 |
| 7,093,897 | B2 | | 8/2006 | Terrand et al. |
| 7,287,813 | B2 | * | 10/2007 | Aliev ................. 297/219.1 |
| 7,472,953 | B1 | * | 1/2009 | Lalji ..................... 297/224 |
| 7,600,813 | B2 | * | 10/2009 | Lanham et al. ........ 297/229 |
| 7,607,732 | B2 | * | 10/2009 | Beroth et al. ......... 297/229 |
| 7,665,804 | B1 | * | 2/2010 | Jeffrey ................. 297/220 |
| 7,997,646 | B2 | * | 8/2011 | Resendez ............. 297/220 |
| 2004/0026966 | A1 | * | 2/2004 | Albersen ........... 297/188.06 |
| 2004/0207239 | A1 | * | 10/2004 | King ................ 297/219.12 |
| 2005/0130537 | A1 | * | 6/2005 | Phelps ................... 442/327 |
| 2005/0179306 | A1 | | 8/2005 | White et al. |
| 2006/0076810 | A1 | * | 4/2006 | Nichols ................. 297/220 |
| 2007/0040426 | A1 | * | 2/2007 | Kenny ................... 297/229 |
| 2008/0001451 | A1 | * | 1/2008 | Olson ................ 297/219.12 |

FOREIGN PATENT DOCUMENTS

| | | |
|---|---|---|
| DE | 29924138 U1 | 9/2002 |
| EP | 1 186 465 A2 | 3/2002 |
| GB | 765895 A | 1/1957 |
| GB | 1 153 209 | 5/1969 |
| GB | 2193980 A | 2/1988 |
| JP | 198156158680 A | 12/1981 |
| JP | 198560215390 A | 10/1985 |
| WO | 9503192 | 2/1995 |

OTHER PUBLICATIONS

Japanese Office Action mailed Jun. 25, 2013 in counterpart Japanese Application No. 2011504379.

German Examination Report dated Aug. 1, 2011, 16 pgs.

* cited by examiner

VEHICLE SEAT COVER AND VEHICLE SEAT WITH SUCH A COVER

CROSS REFERENCE TO RELATED APPLICATIONS

This application claims priority from and the benefit of PCT Application No. PCT/EP2009/002819, filed on Apr. 17, 2009; German Patent No. DE 10 2008 019 775.0, filed on Apr. 18, 2008; and German Patent DE 10 2008 058 219.0, filed on Nov. 19, 2008; all entitled "Vehicle Seat Cover and Vehicle Seat with Such a Cover", which are herein incorporated by reference.

BACKGROUND

The invention relates to a vehicle seat and a vehicle seat cover.

Both the seat part and also the backrest part may have means for varying their original contour and/or their original volume in order to increase comfort and/or safety. For example, a seat cushion may be lengthened or a backrest cushion may be widened, or the seat cushion side cheeks may be expanded.

It was therefore the object of the present invention to provide a seat cover which permanently participates in the above-mentioned variations without becoming unsightly, and to simplify the upholstering of vehicle seats with variable outline contours. The cleaning properties of the cover should also be improved.

The object is achieved by means of a vehicle seat cover which has, in sections, a first layer and a second layer which have different elasticities.

SUMMARY

The present invention relates to a vehicle seat cover which spans the seat part and/or the backrest of a vehicle seat or of a seat bench which provides space for a plurality of seat occupants. A cushioning, such as for example foam, and a seat frame are generally arranged under the vehicle seat cover according to the invention.

According to the invention, the seat cover has, in sections, a first layer and a second layer which have different elasticities. It is preferable for one layer, in particular the layer with the higher elasticity, to always be continuous and for the other to be provided only in sections.

On account of the different elasticities, the layers expand differently under the same force.

The first and second layers are preferably connected to one another in a non-positively locking, positively locking and/or cohesive fashion. The two layers are preferably adhesively bonded and/or sewn to one another.

The second layer preferably has a lower elasticity than the first layer.

The layer with the higher elasticity is preferably arranged in regions which must undergo significant expansion during assembly and/or which must follow a possible change in outline of the cushion situated thereunder.

In a further preferred embodiment, the second layer is arranged on the visible side, that is to say on the side facing towards the vehicle occupant.

It is also preferable for the first layer to be arranged on the visible side.

The second layer is preferably provided in strip-shaped form at least in sections. Said strips are connected in each case individually to the first layer. The spacing of the strips preferably changes in the event of a change in the outline of the cushion situated thereunder. The layer with the higher elasticity is preferably arranged between and under the strips. The cross section of the strips may vary over their longitudinal extent. The strips may converge in an edge region. The strips are particularly preferably arranged transversely with respect to the desired direction of expansion of the vehicle seat cover according to the invention.

The second layer preferably has a bulge which is pulled flat when the seat cover according to the invention is expanded. The bulge is preferably fixed to the first layer situated thereon or thereunder, by virtue of the second layer being correspondingly connected thereto in a non-positively locking, positively locking and/or cohesive fashion.

The seat cover according to the invention is suitable as a cover both for the seat part and for the backrest part.

The seat cover according to the invention preferably has additional reinforcement parts, in particular in the region of mechanically highly loaded regions of the seat cover. Said reinforcement parts may be produced from the same material as the second layer.

The material from which the second layer is produced is preferably PUR.

A further subject matter of the present invention is a vehicle seat having the seat cover according to the invention.

Said vehicle seat may be varied in terms of its shape, in particular for comfort purposes but also for safety purposes.

DRAWINGS

The invention will be explained below on the basis of FIGS. 1-4. Said explanations are merely exemplary and do not restrict the general concept of the invention. The explanations apply equally for all subjects of the invention.

DETAILED DESCRIPTION

Figure 1:
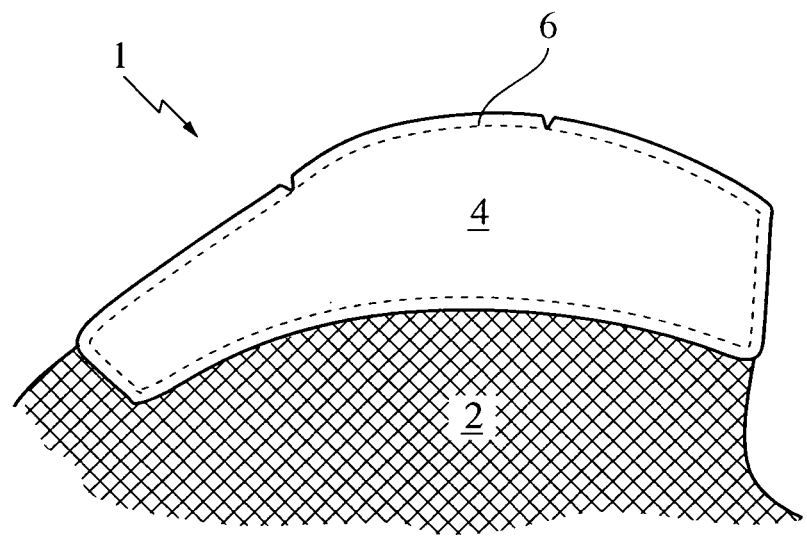
FIG. 1 shows a view of a cover according to the invention according to a first embodiment, viewed from the visible side.
Figure 2:
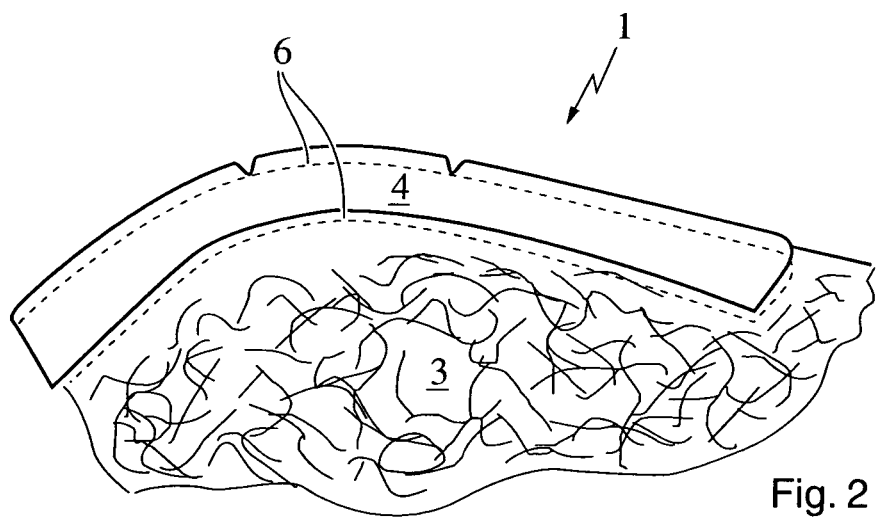
FIG. 2 shows the rear side of the cover according to FIG. 1.

FIGS. 1 and 2 show a first embodiment of the seat cover 1 according to the invention, which a first layer 2 and a second layer 3. The outer layer 2, facing toward the vehicle interior space (visible side), of the cover 1 is produced from a substantially elastically expandable material. The inner layer 3, which is arranged between the outer layer 2 and the cushioning, is in contrast produced from a less expandable material, preferably a material which does not expand under the normally occurring forces. On the side facing toward the vehicle interior space (visible side), an applied and fixed, in particular sewn reinforcement material 4, which is composed for example of PUR and whose surface properties may be matched to those of the rest of the interior, is situated in the edge zone of the two-layer cover 1.

Figure 3:
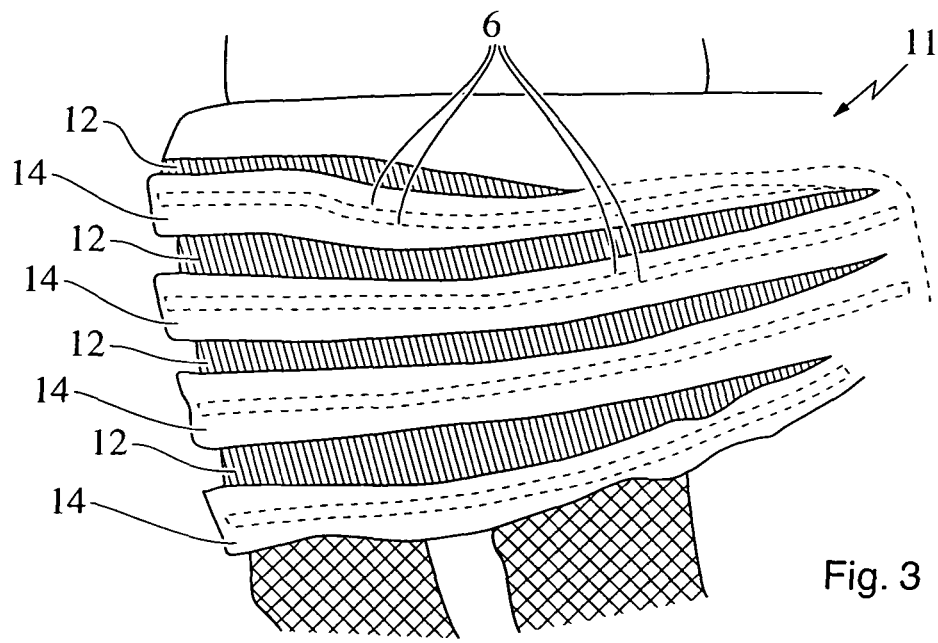
FIG. 3 shows a view of a cover according to the invention according to a further embodiment, viewed from the visible side.

In a further preferred embodiment illustrated in FIG. 3, a reinforcement material 14 such as for example PUR, the second layer, is applied to the elastically expandable base material 12, the first layer, and is fixed thereto in particular by sewing, which reinforcement material is slotted preferably substantially perpendicularly to the direction of the seam. In this way, the first layer situated thereunder can reversibly elastically deform.

Figure 4:
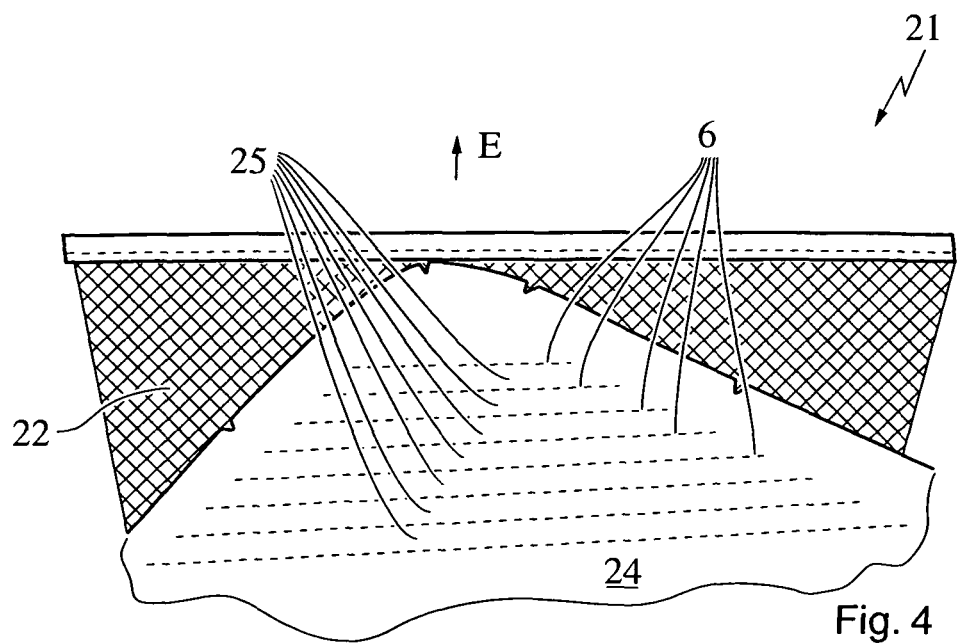
FIG. 4 shows a view of a cover according to the invention according to a third embodiment, viewed from the visible side.

In a further embodiment illustrated in FIG. 4, the reinforcement material 24, the second layer, is produced for example from PUR and is applied to the elastic first layer 22 situated thereunder, and fixed thereto in particular by sewing, transversely with respect to the elastic deformation direction E in regular indentations, or bulges, wherein the bulges are reversibly flattened during the deformation, in particular expansion, of the layer situated thereunder, and are thereby capable of compensating a certain length expansion.

LIST OF REFERENCE SYMBOLS

- 1, 11, 21 Cover
- 2, 12, 22 Elastic layer
- 3 Non-expandable layer
- 4, 14, 24 Reinforcement part
- 25 Bulges
- 6 Seam
- Z Elastic deformation direction

The invention claimed is:

1. A vehicle seat cover comprising, in sections, a first layer and a second layer which have different elasticities, wherein the vehicle seat cover is configured to cover only one of a seat part of a vehicle seat and a backrest of the vehicle seat, the second layer has a lower elasticity than the first layer, the first layer is continuous, the second layer comprises strips spaced apart from one another to form at least one section of the second layer, the strips are arranged transversely to an expansion direction, and wherein the second layer is sewn over the first layer along each of the strips.

2. The vehicle seat cover as claimed in claim 1, wherein the second layer is arranged on a visible side of the seat cover.

3. The vehicle seat cover as claimed in claim 1, wherein the first layer is arranged on a visible side of the seat cover.

4. The vehicle seat cover as claimed in claim 1, wherein the second layer has bulges.

5. A vehicle seat having a vehicle seat cover having, in sections, a first layer and a second layer which have different elasticities, wherein the vehicle seat cover is configured to cover only one of a seat part of a vehicle seat and a backrest of the vehicle seat, the second layer has a lower elasticity than the first layer, the first layer is continuous, the second layer comprises strips spaced apart from one another to form at least one section of the second layer, the strips are arranged transversely to an expansion direction, and wherein the second layer is sewn over the first layer along each of the strips.

6. The vehicle seat as claimed in claim 5, wherein the cover can be varied in shape.

* * * * *